United States Patent Office 2,766,098
Patented Oct. 9, 1956

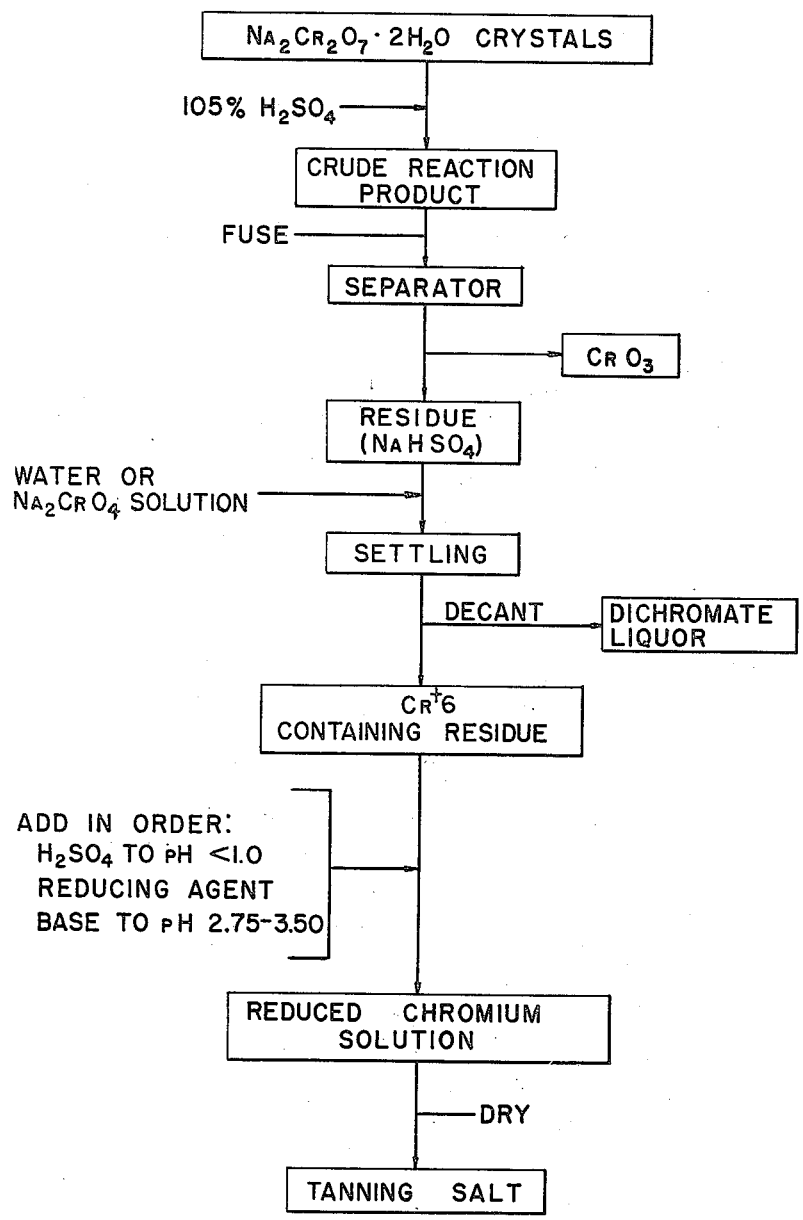

2,766,098

METHOD OF OBTAINING A CHROMIUM-CONTAINING TANNING SUBSTANCE

Tom S. Perrin, Painesville, Ohio, assignor to Diamond Alkali Company, Cleveland, Ohio, a corporation of Delaware Application November 19, 1952, Serial No. 321,416

3 Claims. (Cl. 8—94.27)

This invention relates to a method for obtaining a chromium-containing tanning substance from the waste by-products of the manufacture of chromic acid, and to the recovery of the acid values of such waste by-products.

While it has been proposed to manufacture chromic acid by the treatment of sodium dichromate dihydrate solution with concentrated sulfuric acid, and to recover chromic acid therefrom by crystallization methods and suitable washing, the advantage of this method being that little, if any, sodium bisulfate waste is involved as a by-product of the process, this method so far is but slowly coming into commercial use. The reason for the relatively slow commercialization of this method of making chromic acid lies in the investment in already existing equipment to make chromic acid in accordance with what is known as the "dry" method.

In accordance with the "dry" method, chromic acid is manufactured by fusing sodium dichromate crystals and concentrated sulfuric acid under carefully controlled conditions. Two liquid layers form in this fusion, a chromic acid layer and a sodium hydrogen sulfate layer. During the separation of the layers, the sodium hydrogen sulfate mechanically carries some chromic acid along with it, as well as some chromium which unavoidably becomes reduced during the process.

In view of its impurities the molten mass of sodium hydrogen sulfate comprises a waste material. It is normally flaked and offered on the market as chrome nitre cake or chromic acid waste. Unfortunately, however, little market exists for this material in view of its impurities, and when one considers that for every hundred pounds of chromic acid manufactured in accordance with the "dry" method, 160 pounds of this waste material, more or less, are obtained, it is apparent that a very substantial problem of disposal of relatively valueless by-product exists. Indeed, in the chromic acid manufacture by the "dry" method, it is found from time to time, depending upon market conditions, that the ability to market the waste sodium hydrogen sulfate with its impurities is the difference between feasible economic process and one which cannot be operated because of poor economy involved.

Sundry proposals have been made for disposition of the waste chrome nitre cake obtained from this process. None of these proposals has enjoyed complete acceptance, particularly since none is of sufficiently substantial commercial interest to take up the large amount of waste material which results from the manufacture of chromic acid in accordance with the "dry" method.

The present invention envisions the use of the waste material obtained from "dry" chromic acid manufacture in a manner both to utilize its acid value (sodium hydrogen sulfate providing the acid) and to utilize, in addition, the small amount of chromium, both reduced and unreduced, which exists with the waste material as recovered from the chromic acid manufacturing process. While it is preferred to operate the present invention in conjunction with a chromic acid manufacturing process and with a sodium dichromate manufacturing process, neither is necessary and the process stands on its own feet either in conjunction with one of the two above-mentioned processes or neither of them.

It is an object of the present invention to recover valuable material, both of an acid character and of a chromium-containing character, especially for tanning purposes from the waste material obtained from the "dry" chromic acid manufacturing process.

A further object of the invention is to recover both reduced and unreduced chromium from the waste material from "dry" chromic acid manufacture and to form the same into a tanning salt in a manner to recover the acid and chromium values from such waste with inexpensive processing and simple handling.

Other objects and advantages of the invention will appear from the detailed description below, which includes the flow sheet forming a part of the present invention, which flow sheet may conveniently be followed in the course of the description for the purpose of clarifying the same.

It is noted above that the present invention may suitably be operated in conjunction with a conventional chromate manufacturing process. No extended disclosure of such a process is necessary as the same is quite familiar to those skilled in the art. It is sufficient to say that a chromite ore may suitably be roasted with sodium carbonate and lime to modify the chromium compounds of the ore into soluble form. Upon completion of the roast, leaching with water is conventional to recover a so-called "crude" liquor containing, among other things, chromium in the form of chromate, sodium aluminate, and the like. The first step in work-up and purification of this crude chromate liquor is to precipitate alumina hydrate therefrom, and this is normally accomplished by acidifying the highly alkaline crude solution to a pH of the order of 8.5 to 9, whereupon the alumina hydrate precipitates and can be separated by any convenient means, such as filtration. Reference will be made again below to this acidification step, since it is an important advantage of the present invention to be able to integrate the present invention with this acidification step. Subsequent steps in the purification of the crude chromate liquor from which alumina hydrate has been removed are also conventional and include further acidification, concentration, separation of sodium sulfate, and finally crystallization of sodium dichromate dihydrate, as is well-understood in the art.

In contrast to the above-described ore treating method to obtain sodium dichromate, the "dry" chromic acid process is characterized by requiring highly purified raw materials as starting materials. Thus, sodium dichromate dihydrate crystals are reacted with acid by adding thereto 20% oleum (104.5% $H_2SO_4$), the reaction running in accordance with the equation below:

$SO_3 + 3H_2SO_4 + 2Na_2Cr_2O_7 \cdot 2H_2O + \text{heat} \rightarrow$
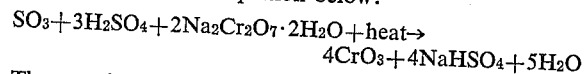
$4CrO_3 + 4NaHSO_4 + 5H_2O$ The reaction mass is heated in a kettle until molten and anhydrous, whereupon gravity separation of the chromic acid takes place, which chromic acid may be withdrawn from the bottom of the kettle and flaked immediately on a drum flaker. The remaining material in the kettle, however, comprising 160 pounds, more or less, for every 100 pounds of chromic acid recovered, is the impure sodium hydrogen sulfate chromium-contaminated material referred to above.

In accordance with the present invention, to this impure material is added a modicum of alumina-hydrate-freed liquor from a chromate recovery process, as disclosed above, or in the alternative, a suitable amount of sodium chromate-containing solution of a relatively high concentration. Such sodium chromate-containing solution, which may contain a concentration of sodium chromate taken as dichromate of the order of 2–3 pounds per gallon and may suitably be of a pH within the range of 8.5–9, is employed to slurry the solid residue remaining. After complete slurrying of the residue is had, the material is allowed to settle in a suitable container, the insolubles going to the bottom of the container and the supernatant liquid remaining above. Upon complete settling having taken place, which may occupy a matter of hours but normally not more than 12 hours, the insoluble materials are filtered off. The supernatant liquid obtained from this filtration may be returned, if desired, to a chromate recovery system at the acidification step described above for the purpose of acidifying the raw leach liquors from a roast to bring the raw leach liquors into the range of 8.5–9 pH to precipitate alumina hydrate therefrom.

The settled insoluble material obtained from the above treatment and containing a considerable quantity of insoluble chromium compounds is now further processed to obtain therefrom a tanning salt. This may be accomplished in either one of two ways: First, if desired, the settled material as recovered from the previous filtration may suitably be dissolved in an amount of strong sulfuric acid to bring the pH of the system to well below 1. Thereupon, a suitable reducing agent, of which various organic reducing agents, including formaldehyde, reducing sugars, corn syrup and the like may be maintained, and of which $SO_2$ is also a known reducer, may be applied to the system to reduce all of the remaining hexavalent chromium in the system to the trivalent state. Thereupon, the system may suitably be adjusted to a pH of the order of 2.5 to 3.5, after which the chromium-containing solution, all of the chromium being in the trivalent state, may suitably be spray-dried and the spray-dried material packaged as a tanning salt.

The alternative to the above-mentioned work-up of the remaining insoluble residue from the filtration described is to test a sample of the remaining insolubles for content of chromium taken as $Na_2Cr_2O_7 \cdot 2H_2O$ and sodium sulfate, and then by computing back, estimate the ideal quantities of these materials to have in a tanning salt. Thus, if it is found that say 50% of the desired concentration of chromium compounds and sodium sulfate is present in the remaining solids, the material may then be suitably dissolved in strong acid and sufficient chromium compounds and sodium sulfate to equal the desired concentration for a tanning salt of commerce, preferably that which will ultimately yield a tanning salt having of the order of between 20% and 25% of chromium, taken as $Cr_2O_3$, and between 20% and 30% of sodium sulfate, may be added to this material. Thereupon, the reducing step as described above is gone through and finally the pH is adjusted and the solution spray-dried, whereupon a tanning salt in every way equivalent to tanning salts of commerce prepared from purified dichromate is obtained.

It will be appreciated that in accordance with the present invention, a material which otherwise is totally wasted or sold as a highly impure material has been reprocessed to obtain therefrom the chromium values, and these chromium values have been modified in a form to make them available as a tanning salt, a much more upgraded form of chromium than in the original waste material.

As an alternative to the method described in general above, the residue from a chromic acid preparation as shown in the flow sheet, may suitably be treated with water in place of the sodium chromate solution described above, and the same settling, filtration, and subsequent treatment employed. In such case, however, it is probable that it will not be practicable to prepare a tanning salt direct without adding additional chromium values to the material at the acidification step prior to reduction. In accordance with this feature of the invention, the chromium values in the waste material are still recovered but advantage is not taken of return of acidified mother liquor to a dichromate recovery process. It will be appreciated that this aspect of the invention is of more significance to manufacturers of chromic acid who are not also manufacturers of dichromate.

Throughout the discussion herein, reference has been made largely to the sodium salts of the various compounds involved since these are the most economical to work with and are, in fact, the articles of commerce for the most part which would be dealt with in such operations. However, no limitation is to be implied from the disclosure having been couched in these terms since, of course, any alkali metal or other salts may be employed in the system, by which is included potassium, rubidium, cesium, and the like.

In order that those skilled in the art may more fully understand the character of the invention involved herein, the following specific examples are set forth:

Example I

In the preparation of chromic acid 107.97 pounds of 20% oleum (104.5% $H_2SO_4$) are combined in a coned-bottom reaction kettle with 160.33 pounds of sodium dichromate dihydrate. This material is heated with stirring to a temperature of about 203° C., after which the agitator is shut off and the material allowed to settle into two layers, the lower of which is chromic acid. This material is dumped and removed for further processing, leaving behind 160 pounds of impure sodium bisulfate containing acid value taken as $H_2SO_4$ of the order of between 35% and 40%, sodium sulfate calculated from the acid value of the order of 50% to 57%, and chromium calculated as $Na_2Cr_2O_7 \cdot 2H_2O$ of between 6% and 7.5%.

Example II

Employing the waste material obtained by the method described in Example I above, 6958 pounds of waste and 6958 pounds of water are mixed in a coned-bottom, lead-lined tank, at room temperature with agitation. This tank, equipped with steam coils, has an agitator driven at 94 R. P. M. When slurrying is complete, settling is allowed to take place until 92.3 gallons of settled sludge occupy the coned bottom, there being 61% of solids in the sludge. A supernatant liquor comprising largely dissolved bisulfate may be discarded or returned to acidify the leach liquor from a chrome ore roasting process. 4691 pounds of 90% $H_2SO_4$ are added to the sludge with agitation to dissolve the same, the mixture being heated until solution is readily obtained. To this solution is then added 4771 pounds of 93.2% (66° Bé.) sulfuric acid and 4755 pounds of sodium dichromate dihydrate and 1000 pounds of aluminum sulfate. After thorough agitation, this mixture is reduced with corn syrup until no further test can be obtained for hexavalent chromium in the system. Thereupon, 333 pounds of sodium carbonate are added to adjust the pH to 3.3. This material is spray-dried on a spray drier and its tanning properties tested.

The normal chromium tanning salt of commerce comparable in amount to that described above is prepared from the combination of 5000 pounds of 66° Bé. sulfuric acid and 5000 pounds of sodium dichromate dihydrate. It is, therefore, seen that by this system a saving in sodium dichromate of 255 pounds has been obtained or approximately 5%. When it is appreciated that otherwise this material would have been sent to waste and thus lost, it can be seen that the present invention has provided for making a valuable product out of a valueless one.

Example III 4400 gallons of so-called "neutral yellow liquor," being a sodium chromate solution recovered from a sodium dichromate process, alumina hydrate free, and having a pH of approximately 8.5 and containing in all 9064 pounds of chromate as sodium dichromate dihydrate, has added to it 8790 pounds of chromic acid waste recovered as described in Example I. An additional 1917 gallons of water are added and the whole is agitated until a relatively homogeneous system is obtained. Thereupon, the system is permitted to settle for a period of 40 hours, after which 6874 gallons of supernatant liquor are decanted from the top of the system and returned to a chromate treating process to acidify the raw liquor from the leaching of alkali-roasted ore, and thus result in the precipitation of alumina hydrate, as has been described herein. 104 gallons of slurried solids remains. This material is found to contain the equivalent of 41 pounds of $H_2SO_4$ and 119 pounds of sodium dichromate dihydrate. In order to make a batch of tanning solution which ordinarily would require 4900 pounds of 95% $H_2SO_4$ and 5000 pounds of $Na_2Cr_2O_7 \cdot 2H_2O$, therefor, 4859 pounds 66° Bé. acid and 4881 pounds of sodium dichromate dihydrate are added to the slurried solids. The procedure followed in Example II above of reducing with corn syrup, adjusting the pH with 333 pounds of ash is followed, and upon spray drying, a material equivalent in all respects to commercial tanning salt prepared from dichromate, acid, and reducing agent, only is obtained. As set forth above, savings both in acid and chromium values are obtained by employing the waste material.

While there have been described various embodiments of the invention, the methods described are not intended to be understood as limiting the scope of the invention as it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. The method of obtaining a tanning substance from the waste bisulfate-containing residue from the manufacture of chromic acid by reacting bichromate crystals with sulfuric acid, which method includes the steps of slurrying said solid waste bisulfate-containing residue with an aqueous solvent for said bisulfate, said solvent being selected from the group consisting of water and a water solution of alkali metal hexavalent chromium salt, settling the resulting slurry to obtain a supernatant liquid and a solid-containing bottom, decanting the supernatant liquid, dissolving the solid-containing bottom in sulfuric acid, the concentration and amount of said acid being sufficient to adjust the acidity of the resulting solution to a pH less than 1, adding to the resultant solution sufficient reducing agent to reduce the hexavalent chromium remaining in said solution to the trivalent state, adding to said solution sufficient alkali to provide a pH substantially within the range of 2.5–3.5, and removing water from the latter solution.

2. The method as claimed in claim 1 wherein the slurrying liquid is water.

3. The method as claimed in claim 1 wherein the slurrying liquid is sodium chromate solution.

References Cited in the file of this patent

UNITED STATES PATENTS

| | | |
|---|---|---|
| 528,162 | Hinzerling | Oct. 30, 1894 |
| 556,325 | Sadtler | Mar. 10, 1896 |
| 688,294 | Carmickel | Dec. 10, 1901 |
| 1,909,865 | Meyer et al. | May 16, 1933 |
| 1,993,298 | Merritt | Mar. 5, 1935 |
| 2,110,961 | Merritt | Mar. 15, 1938 |

FOREIGN PATENTS

| | | |
|---|---|---|
| 198,645, | Great Britain | Dec. 13, 1923 |
| 488,930 | Germany | Jan. 9, 1930 |

OTHER REFERENCES

Merry: "The Chrome Tanning Process," pages 5–18 and 23–33. Pub. January 1936 by Phila. Book Co., Phila., Pa.

Bowes: Article in "Progress in Leather Science 1920–1945." Pub. 1948 by B. L. M. R. A., London, Eng., pages 519–523.

"Modern Practice in Lea. Manufacture," by Wilson, page 363. Pub. 1941, Reinhold Pub. Corp.

J. A. L. C. A., page 53, January 1945.

J. I. S. L. T. C., page 197, August 1944.

J. A. L. C. A., page 322, vol. 45 No. 5, May 1950.

Chem. Abst., vol 43, 1949, page 4884 (cited in J. I. S. L. T. C., November 1949).